April 21, 1959
G. E. S. TOMLINSON
2,883,199
COLLET CHUCK ACTUATING MECHANISM
Filed June 12, 1956
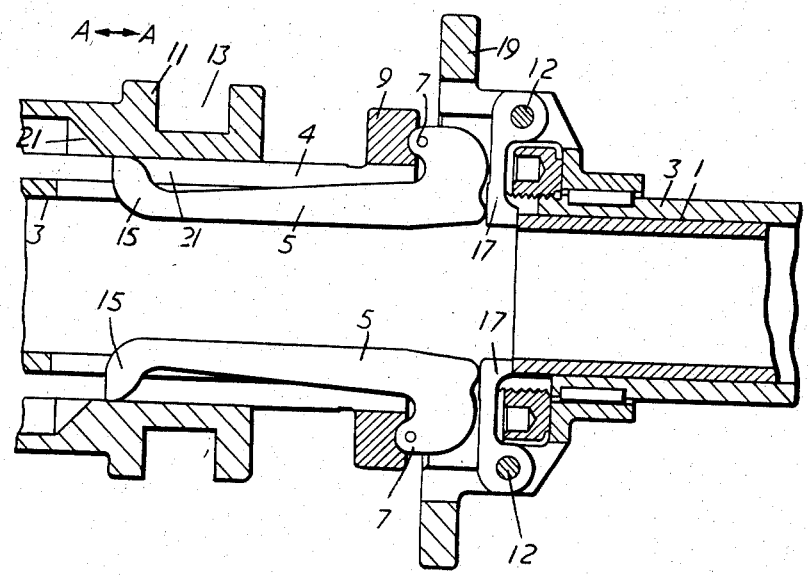
Inventor
Geoffrey E. S. Tomlinson
By Morris & Matheson
Attorneys

United States Patent Office 2,883,199
Patented Apr. 21, 1959

2,883,199

COLLET CHUCK ACTUATING MECHANISM

Geoffrey E. S. Tomlinson, Cardiff, Wales, assignor to The Birmingham Small Arms Company Limited, Birmingham, England, a British company Application June 12, 1956, Serial No. 590,860

Claims priority, application Great Britain June 17, 1955

1 Claim. (Cl. 279—51)

This invention relates to chucks for automatic lathes or other machines of the kind wherein a chuck or collet mounted on the end of a hollow spindle is operated in known manner by end pressure through axial movement imparted to an abutting thrust tube slidably mounted within the hollow spindle which is actuated by an operating sleeve slidably mounted on the hollow spindle and connected by a yoke lever with a chucking cam on the machine, pivotally mounted actuating levers associated with the operating sleeve being adapted to impart movement to the thrust tube whereby the jaws of the chuck or collet are adapted to be closed thereby effectively gripping a bar stock or workpiece in the operative cycle of the machine.

In mechanism of the aforesaid kind the pivotally mounted actuating levers associated with the operating sleeve engage directly with the end of the thrust tube, and since the direction of lever movement at said point of contact is arcuate about a pivot point of the lever which abuts against an adjustable ring adjacent to the operating sleeve, the force applied to the tube by the actuating lever may be divided into two component forces, one component being in the required direction to operate the thrust tube, and one component being in an outward direction. This outward component results in friction being set up between the thrust tube and the interior of the hollow spindle in which the tube is mounted, which is objectionable in that it reduces the amount of useful effort applied to the thrust tube in closing the chuck or collet.

According to the present invention, a collet chuck operating mechanism for automatic lathes and other machines is provided with a collet-operating member which is provided with a given uni-directional movement by means of a lever the operative portion of which moves in the same general direction as, but is not identical with, the uni-directional movement of the collet operating member, characterised by the fact that the component of force transmitted by the lever in the non-given direction is not transmitted to the collet operating member.

Preferably the reaction to the component of force in the non-given direction is taken at a pivot point of a second lever, interposed between the first lever and the collet-operating member.

The collet operating member may be arranged to be provided with a given uni-directional movement, such movement being transmitted by a lever which is arranged to transmit only movement in the given direction, movement being imparted to the lever from a pivoted actuating lever which is adapted to be moved in a direction substantially at right angles to the given uni-directional movement desired at the collet operating member.

The collet operating member may be a part of the collet, or may be an interposed member acting upon the collet.

Two or more sets of collet operating mechanism may be provided, in which case the sets of mechanism may be radially spaced about the spindle of the machine tool.

One preferred embodiment of the present invention will now be particularly described with reference to the accompanying drawing which is a diagrammatic sectional view of an operating mechanism for actuating a collet on a machine tool.

A thrust tube 1 is carried within a hollow spindle 3, the thrust tube abutting against a collet (not shown) and when actuated serving in known manner to operate the collet.

Two longitudinally disposed actuating levers 5 operate in diametrically opposed slots 4 in the spindle 3, the levers 5 being pivoted at 7 in a fulcrum ring 9. The ring 9 is adjustable along the hollow spindle 3 in known manner.

An operating sleeve 11 is concentrically disposed about the spindle 3, the sleeve being adapted in known manner to be moved in the direction A—A by a yoke (not shown) acting in the recess 13.

The sleeve 11 is provided with a cam face 21 formed internally and adapted to engage one end 15 of each of the levers 5.

Two dependent abutment levers 17 are provided associated with the levers 5, the levers 17 being pivoted at 12 in an annular member 19 which is secured to the spindle 3.

In order to close the collet it is necessary to move the thrust tube 1 to the right through the medium of the levers 5 as illustrated in the drawing, and in the opposite direction, i.e. to the left, to open the collet, said opening movement being effected in known manner by a coil spring (not shown) acting to move the tube in a direction opposite to that imparted thereto by the levers 5.

By moving the operating sleeve 11 to the position illustrated in the drawing, by movement of the yoke in the recess 13, the horizontal part of the cam face 21 will depress the ends 15 of the levers 5.

By virtue of the pivot 7 this movement will be transmitted via the levers 17 as a longitudinal thrust against the end of the thrust tube 1, and hence to the collet.

The reverse movement of the sleeve 11 causes the spring load on the thrust tube to be released when the ends 15 of the levers 5 enter the annular recess in the sleeve.

It will be appreciated that this improved mechanism will result in the outward component of the thrust of the lever 5 being taken on the pivot 12 of the abutment lever 17, a substantially pure axial thrust being imparted to the thrust tube 1. Thus outward forces tending to produce friction between the thrust tube and its mounting are virtually eliminated, leading to smoother and easier collet operation.

I claim:

A collet chuck operating mechanism for automatic lathes and other machines having a hollow spindle, comprising in combination a thrust tube movable axially in the hollow spindle and constituting a collet operating member, an operating sleeve slidably mounted on the hollow spindle, actuating levers for the thrust tube pivotally mounted for movement radially of the spindle by the operating sleeve, and abutment levers pivotally mounted on the spindle and disposed between the actuating levers and thrust tube so that the ends of the abutment levers remote from their pivots are engaged by the actuating levers and thrust tube, the pivots of the actuating and abutment levers being so located that reaction to the component of force transmitted by the actuating levers in an outward direction is taken at the pivot points of the abutment levers.

References Cited in the file of this patent

UNITED STATES PATENTS

| 810,782   | Mason       | Jan. 23, 1906 |
| 2,732,216 | Sloan et al. | Jan. 24, 1956 |